(12) United States Patent
Hwang

(10) Patent No.: US 11,822,210 B2
(45) Date of Patent: Nov. 21, 2023

(54) ELECTRONIC DEVICE INCLUDING CAMERA

(71) Applicant: Samsung Electronics Co., Ltd., Gyeonggi-do (KR)

(72) Inventor: Youngjae Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 17/071,060

(22) Filed: Oct. 15, 2020

(65) Prior Publication Data
US 2021/0116787 A1   Apr. 22, 2021

(30) Foreign Application Priority Data

Oct. 16, 2019   (KR) .......................... 10-2019-0128760

(51) Int. Cl.
*G03B 13/36* (2021.01)
*G02B 7/09* (2021.01)

(52) U.S. Cl.
CPC .............. *G03B 13/36* (2013.01); *G02B 7/09* (2013.01)

(58) Field of Classification Search
CPC ... G02B 7/08; G02B 7/04; G02B 7/09; G02B 7/023; G02B 7/02; G02B 7/022; G02B 7/102; G02B 7/14; G02B 7/021; G02B 7/025; G02B 7/18; G02B 7/24; G02B 7/28; G02B 3/14; G02B 3/10; G02B 3/36; G02B 3/00; G02B 9/64; G02B 9/62; G02B 9/04; G02B 9/34; G02B 9/60; G02B 9/00; G02B 9/24; G03B 17/02; G03B 17/04; G03B 17/14; G03B 17/12; G03B 17/08; G03B 17/0804; G03B 17/0808; G03B 17/0896; G03B 13/36; G03B 13/18; G03B 13/009;
(Continued)

(56) References Cited

U.S. PATENT DOCUMENTS 7,519,282 B2   4/2009   Shin et al.
7,653,294 B2 *  1/2010   Ishii ........................ H04N 23/68
                                                                348/208.11
(Continued)

FOREIGN PATENT DOCUMENTS

CN   100510844 C   7/2009
EP   1814318 B1   3/2013
(Continued)

OTHER PUBLICATIONS

Extended European Search Report dated Oct. 11, 2022.
International Search Report dated Feb. 10, 2021.

*Primary Examiner* — Stephone B Allen
*Assistant Examiner* — Tamara Y. Washington
(74) *Attorney, Agent, or Firm* — Cha & Reiter, LLC

(57) ABSTRACT

An electronic device includes a housing including an opening, and a camera module at least partially exposed to an exterior environment of the electronic device through the opening, wherein the camera module includes: a lens unit, an image sensor configured to convert light received through the lens unit into an electrical signal, a magnetic member, a coil unit disposed on a first surface of the magnetic member and oriented to face the magnetic member, a magnetic substance unit coupled to a second surface of the magnetic member, and a position sensor disposed adjacent to the magnetic member and oriented to face at least a portion of the magnetic substance unit.

20 Claims, 13 Drawing Sheets

(58) Field of Classification Search
CPC ...... G03B 13/02; G03B 13/04; G03B 13/001;
G03B 13/0065; G03B 13/002; G03B
13/004; G03B 13/06; G03B 13/16; G03B
2217/005
See application file for complete search history.

(56) References Cited

U.S. PATENT DOCUMENTS

| | | | |
|---|---|---|---|
| 9,407,799 | B2 | 8/2016 | Kasamatsu |
| 9,438,801 | B2 | 9/2016 | Hwang et al. |
| 9,467,603 | B2 | 10/2016 | Kasamatsu |
| 9,832,383 | B2 | 11/2017 | Iwang et al. |
| 9,915,802 | B2 | 3/2018 | Murakami et al. |
| 10,365,124 | B2 | 7/2019 | Sugawara et al. |
| 10,527,818 | B2 | 1/2020 | Murakami et al. |
| 10,594,910 | B2 | 3/2020 | Lee et al. |
| 11,402,604 | B2 | 8/2022 | Lee et al. |
| 2006/0269262 | A1 | 11/2006 | Shin et al. |
| 2007/0206934 | A1 | 9/2007 | Ishii et al. |
| 2015/0015729 | A1 | 1/2015 | Kasamatsu |
| 2015/0049209 | A1 | 2/2015 | Hwang et al. |
| 2015/0229842 | A1 | 8/2015 | Kasamatsu |
| 2016/0353029 | A1 | 12/2016 | Hwang et al. |
| 2017/0059880 | A1 | 3/2017 | Fujinaka |
| 2017/0115466 | A1 | 4/2017 | Murakami et al. |
| 2018/0120532 | A1 | 5/2018 | Murakami et al. |
| 2018/0172478 | A1 | 6/2018 | Sugawara et al. |
| 2019/0196139 | A1* | 6/2019 | Lee .................. G02B 27/646 |
| 2019/0273847 | A1 | 9/2019 | Lee et al. |

FOREIGN PATENT DOCUMENTS

| | | |
|---|---|---|
| JP | 2017046569 A | 3/2017 |
| KR | 10-2012-0045333 A | 5/2012 |
| KR | 10-2014-0144126 A | 12/2014 |
| KR | 10-2015-0020951 A | 2/2015 |

\* cited by examiner

ELECTRONIC DEVICE INCLUDING CAMERA

CROSS-REFERENCE TO RELATED APPLICATION(S)

This application is based on and claims priority under 35 U.S.C. § 119 to Korean Patent Application No. 10-2019-0128760, filed on Oct. 16, 2019, in the Korean Intellectual Property Office, the disclosure of which is incorporated by reference herein its entirety.

BACKGROUND

1. Field

The disclosure relates to an electronic device including a camera, and more particularly, to a size-efficient camera and electronic device equipped with the same.

2. Description of Related Art

An electronic device, such as a smartphone or a tablet PC, may include a camera module. The camera module may include a lens and an image sensor. The image sensor may generate an electrical signal using light received through the lens.

The electronic device may support photographic capture of imagery. To increase user convenience, photographic capture may further support mechanisms and processes which may compensate for a user's movement and/or shaking while holding the electronic device (e.g., an optical image stabilizer (OIS) or an auto focus (AF) function).

For example, with optical image stabilization, the electronic device may detect and compensate for small movements of a user's hand, which may allow clear capture of photographic imagery. In another example, with auto-focusing, the electronic device may automatically control a lens to focus on an object indicated by the user.

The above information is presented as background information only to assist with an understanding of the disclosure. No determination has been made, and no assertion is made, as to whether any of the above might be applicable as prior art with regard to the disclosure.

SUMMARY

According to the related art, the electronic device may perform an OIS function or an AF function using a magnetic member and a coil. The electronic device may include a position sensor (e.g., a "Hall" sensor) to detect a position of the magnetic member. The position sensor is disposed in the electronic device overlapping with the central portion, which corresponds to the strongest intensity of a magnetic field generated by the magnetic member, so as to detect the position of the magnetic member more accurately. In this case, the positions at which the position sensor and the magnetic member are disposed are usually fixed. Often, the position and the size of the coil are determined according to the position and the size of the position sensor. Accordingly, it may be difficult to reduce the size of the camera module.

Aspects of the disclosure are to address at least the above-mentioned problems and/or disadvantages and to provide at least the advantages described below.

In accordance with an aspect of the disclosure, an electronic device may include a housing including an opening, and a camera module at least partially exposed to an exterior environment of the electronic device through the opening, wherein the camera module includes a lens unit, an image sensor configured to convert light received through the lens unit into an electrical signal, a magnetic member, a coil unit disposed on a first surface of the magnetic member and oriented to face the magnetic member, a magnetic substance unit coupled to a second surface of the magnetic member, a position sensor disposed adjacent to the magnetic member and oriented to face at least a portion of the magnetic substance unit.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals.

DETAILED DESCRIPTION

Figure 1:
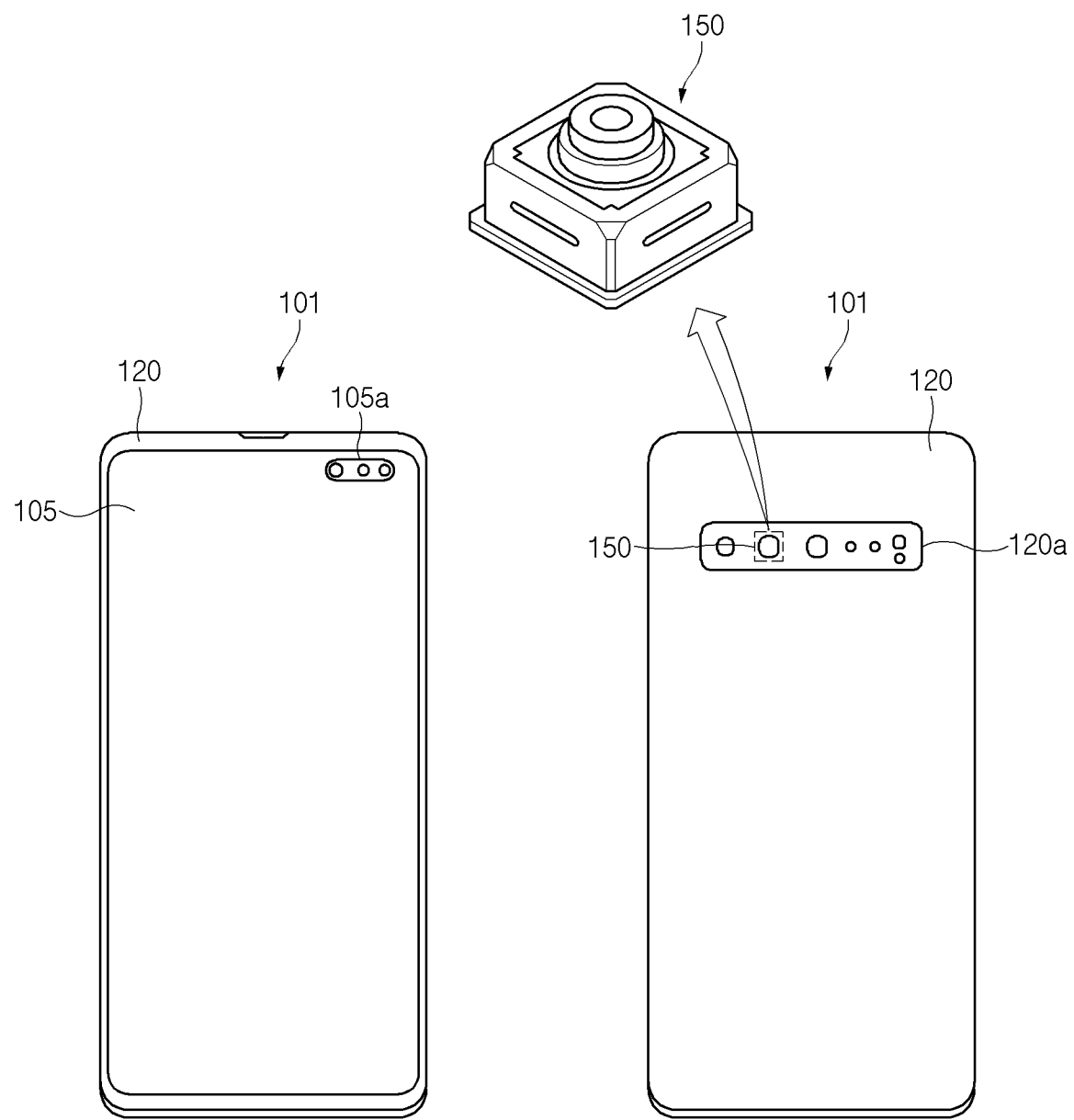
FIG. 1 illustrates an electronic device according to certain embodiments.

Certain embodiments in the disclosure may be described with reference to accompanying drawings. However, those of ordinary skill in the art will understand that the disclosure is not limited to a specific embodiment, and modifications, equivalents, and/or alternatives on the certain embodiments described herein can be variously made without departing from the disclosure. With regard to description of drawings, similar elements may be marked by similar reference numerals FIG. 1 illustrates an electronic device according to certain embodiments.

Referring to FIG. 1, an electronic device 101 may include a display 105, and a housing (or body part) 120.

The display 105 may output a variety of visual content such as a text, an image, or an icon. For example, the display 105 may output a web-page or a screen for transmitting or receiving a message. For another example, the display 105 may output an image based on image data collected through a camera module (or a camera, a camera device, an image photographing device) 150.

According to certain embodiments, the display 105 may include an opening 105a to expose a lens of the camera or a sensor window to an exterior environment.

The display 105 may be mounted in the housing 120. The display 105 may occupy a majority of an area of a first surface (e.g., a frontal glass cover) of the housing 120.

The housing 120 may include various elements or components utilized to drive the electronic device 101 therein. For example, the housing 120 may include components such as a processor, a memory, a communication circuit, or a camera module 150, therein.

According to certain embodiments, the housing 120 may include an opening 120a that exposes the lens of the camera module 150 to an exterior environment. The lens of the camera module 150 may be exposed through the opening 120a.

The following description is made describing the camera module 150 as implementing a rear camera provided on a second surface (e.g., a back cover) of the housing 120, but the disclosure is not limited thereto. For example, an additional camera module may be provided on a front camera. In addition, a dual camera may include two camera modules, and a triple camera may include three camera modules.

The camera module (or a camera, a camera device, or an imaging device) 150 may collect image data using light received through the lens. The camera module 150 may include a driving unit (actuator) for auto-focus or "AF" control. The driving unit may be implemented using the combination of the magnetic member and the coil. The driving unit may perform AF control by adjusting a position of the lens using electromagnetic forces generated by the magnetic members and the coil.

According to certain embodiments, the camera module 150 may further include a position sensor (e.g., a hall sensor) that can detect the position of the magnetic member. The position sensor may not be interposed between the magnetic member and the coil, but may be disposed on the side surface of the magnetic member. In this case, a ferromagnetic substance (e.g., yoke) attached to the magnetic member may extend from a surface thereof, and be oriented facing the position sensor, and may compensate for magnetic flux weakening as the position sensor is disposed on the side surface.

Figure 2:
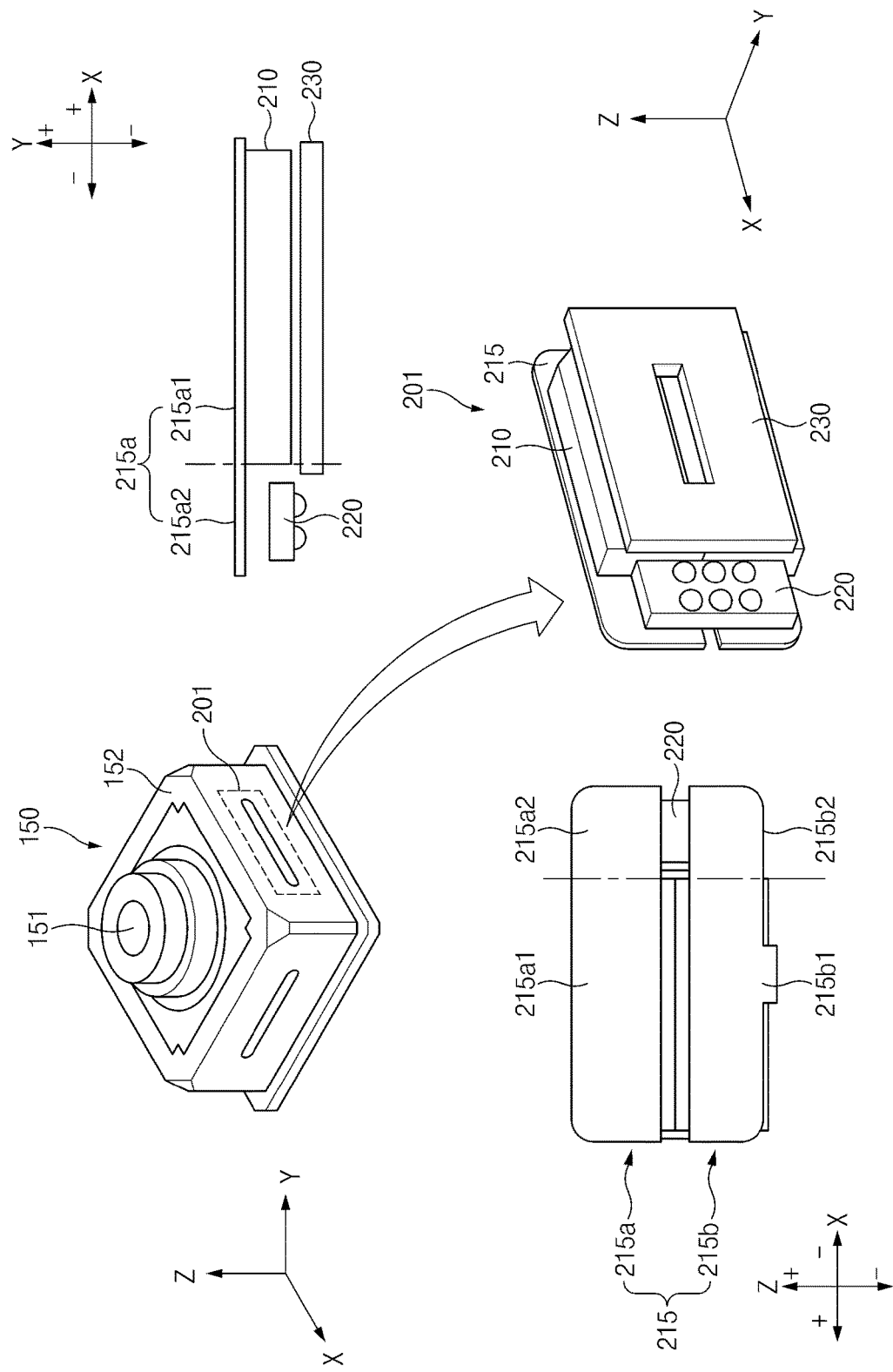
FIG. 2 illustrates a camera module, according to an embodiment.

FIG. 2 illustrates a camera module, according to an embodiment.

Referring to FIG. 2, the camera module 150 may include a lens unit 151 and a main body 152.

The lens unit 151 may collect light that is received by the device after reflecting off of a subject. The collected light may be imaged on an image sensor disposed inside the main body 152. The image sensor may convert the light into an electronic image signal through a photoelectric conversion effect.

The main body 152 may include various components utilized to capture an image therein. For example, the main body 152 may include an image sensor, a shutter unit, and a driving unit for the OIS.

According to certain embodiments, the main body 152 may include an AF driving unit 201 for AF control. The AF driving unit 201 may generate reciprocating movement of the lens unit 151 in a Z-axis direction.

According to an embodiment, the AF driving unit 201 may include an AF magnetic member 210, an AF magnetic substance (e.g., yoke) 215, an AF position sensor 220, and an AF coil 230.

The AF magnetic member 210 and the AF coil 230 may allow the lens unit 151 to move in the Z-axis direction through electromagnetic force. The AF coil 230 may be disposed on a first surface (i.e., a surface facing a negative y axis direction) of the AF magnetic member 210, and the AF magnetic substance 215 may be disposed on a second surface (i.e., a surface facing a positive y axis direction) of the AF magnetic member 210.

The AF position sensor 220 may detect a variation in magnetic flux generated by the AF magnetic member 210, and convert the variation into the electrical signal. The AF position sensor 220 may be used to detect the position of the AF magnetic member 210. According to an embodiment, the AF position sensor 220 may be implemented using a hall sensor.

The AF position sensor 220 may be disposed on a side surface (e.g., a surface facing a negative x axis direction) perpendicular to the first surface (or second surface) of the AF magnetic member 210. The AF position sensor 220 may not be interposed between the AF magnetic member 210 and the AF coil 230.

Although the AF position sensor 220 may be disposed on the side surface, which faces the negative x axis direction, of the AF magnetic member 210, the disclosure is not limited thereto. For example, the AF position sensor 220 may be disposed on a side surface, which is oriented as to face a positive x direction, of the AF magnetic member 210. In this case, the AF magnetic substance 215 may extend in the positive x axis direction, corresponding to the relative position of the AF position sensor 220.

The AF magnetic substance 215 may be attached to the second surface (i.e., the face facing the positive y axis direction) of the AF magnetic member 210. The AF magnetic substance 215 may be implemented with a ferromagnetic substance (e.g., metal) that can be magnetized by the AF magnetic member 210. The AF magnetic substance 215 may improve reception sensitivity for the magnetic flux of the AF position sensor 220.

According to an embodiment, the AF magnetic substance 215 may include a first part 215a coupled (e.g., connected) to a first pole (e.g., an N pole) of the AF magnetic member 210 and a second part 215b coupled (e.g., connected) to a second pole (e.g., an S pole) of the AF magnetic member 210. The first part 215a may include a first magnet bonding part 215a1 and a first extension part 215a2 extending from the first magnet bonding part 215a1 to face the AF position sensor 220. The first magnet bonding part 215a1 and the first extension part 215a2 may have a planar shape. Similarly, the second part 215b may include a second magnet bonding part 215b1 and a second extension part 215b2 extending from the second magnet bonding part 215b1 to face the AF position sensor 220. The second magnet bonding part 215b1 and the second extension part 215b2 may have a planar shape.

Figure 8A:
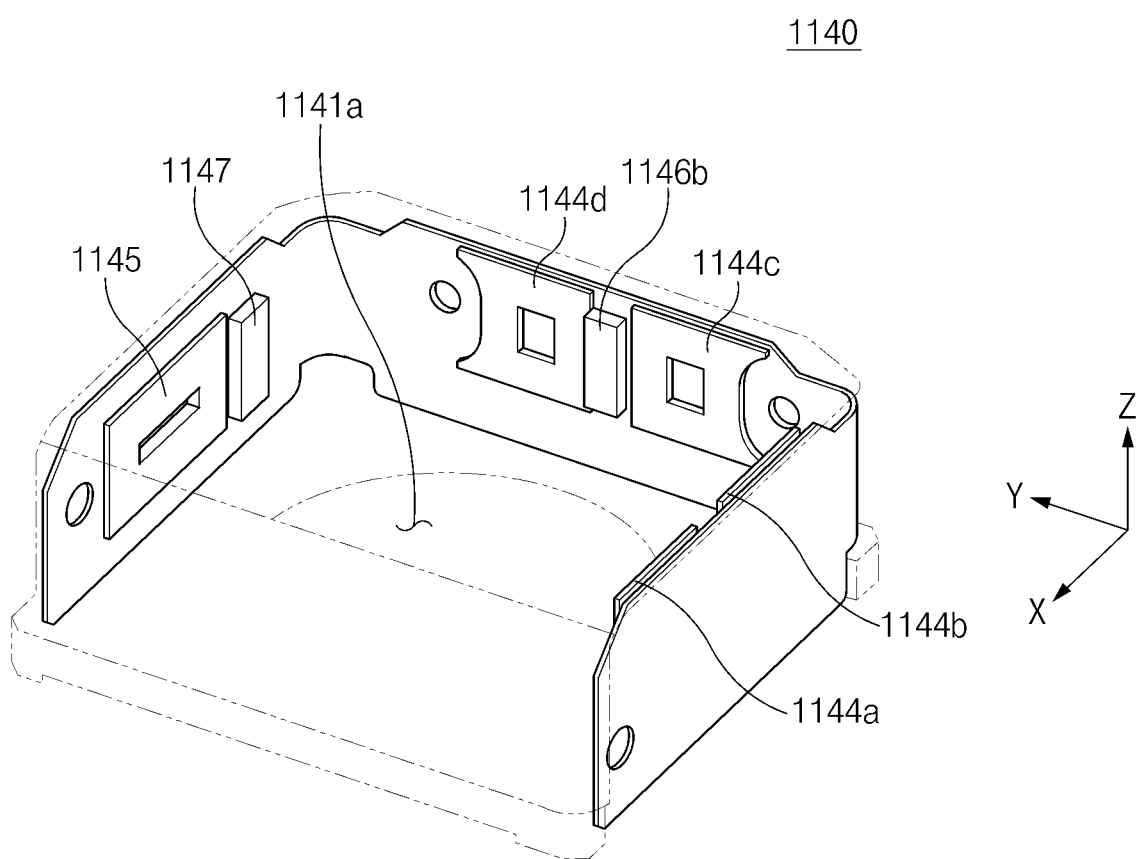
FIG. 8A is an exploded perspective view illustrating a housing assembly illustrated in FIG. 6, when viewed in one direction.
Figure 8B:
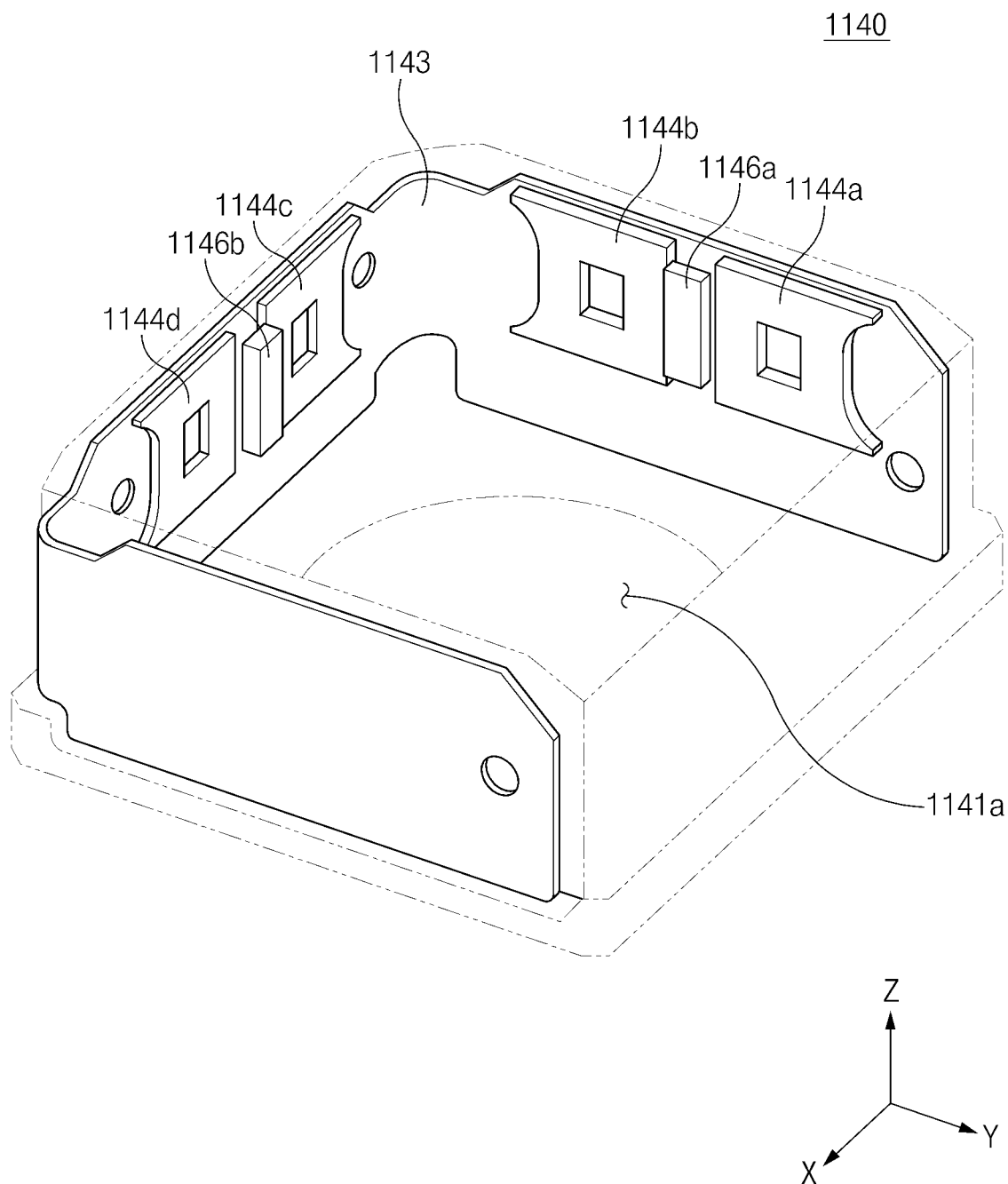
FIG. 8B is an exploded perspective view illustrating a housing assembly illustrated in FIG. 6, when viewed in a direction different from the direction of FIG. 8A.

According to an embodiment, the AF position sensor 220 and the AF coil 230 may be attached to one flexible printed circuit board (not illustrated, see FIGS. 8A and 8B). The AF position sensor 220 and the AF coil 230 may be arranged in parallel to one another on the flexible printed circuit board.

Figure 3:
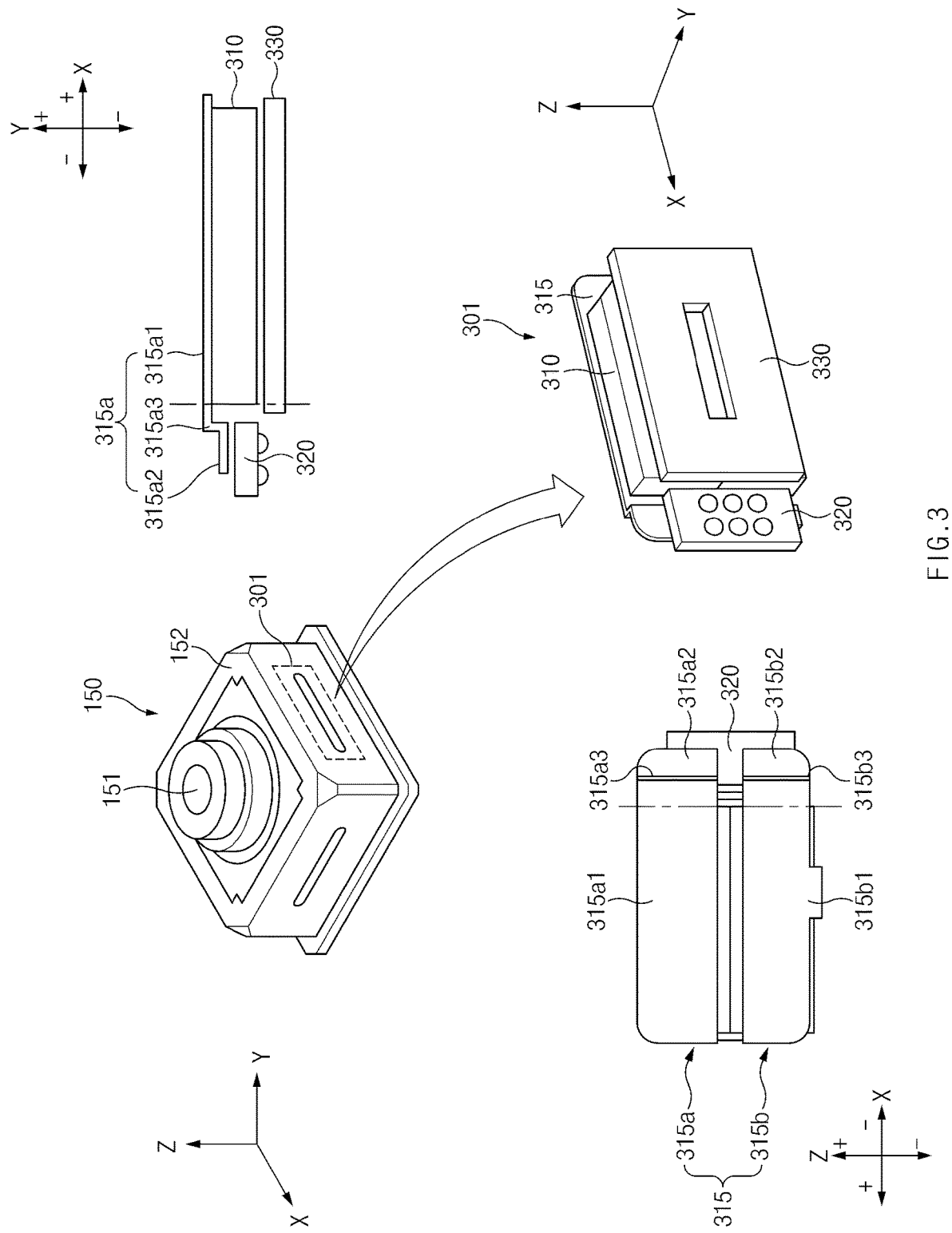
FIG. 3 illustrates a camera module, according to another embodiment.

FIG. 3 illustrates a camera module, according to another embodiment.

Referring to FIG. 3, the camera module 150 may include the lens unit 151 and the main body 152. According to certain embodiments, the main body 152 may include an AF driving unit 301 for AF control. The AF driving unit 301 may generate a reciprocating movement of the lens unit 151 in the Z-axis direction.

According to an embodiment, the AF driving unit 301 may include an AF magnetic member 310, an AF magnetic substance (e.g., yoke) 315, an AF position sensor 320, and an AF coil 330.

The AF magnetic member 310 and the AF coil 330 may facilitate movement of the lens unit 151 in the Z-axis direction through electromagnetic force. The AF coil 330 may be disposed on a first surface (i.e., a surface facing a negative y axis direction) of the AF magnetic member 310, and the AF magnetic substance 315 may be disposed on a second surface (i.e., a surface facing a positive y axis direction) of the AF magnetic member 310.

The AF position sensor (e.g., a hall sensor) 320 may detect a variation in magnetic flux generated by the AF magnetic member 310 and convert the variation into the electrical signal. The AF position sensor 320 may be used to detect the position of the AF magnetic member 310. The AF position sensor 320 may be disposed on a side surface (e.g., a surface facing a negative x axis direction) perpendicular to the first surface (or second surface) of the AF magnetic member 310.

The AF magnetic substance 315 may be attached to the second surface (i.e., the face facing the positive y axis direction) of the AF magnetic member 310. The AF magnetic substance 315 may be implemented with a ferromagnetic substance (e.g., metal) that can be magnetized by the AF magnetic member 310. The AF magnetic substance 315 may improve the reception sensitivity for the magnetic flux of the AF position sensor 320.

According to an embodiment, the AF magnetic substance 315 may include a first part 315a connected to a first pole (e.g., an N pole) of the AF magnetic member 310 and a second part 315b connected to a second pole (e.g., an S pole) of the AF magnetic member 310.

The AF magnetic substance 315 may include stepped structures 315a3 and 315b3 formed on at least a portion thereof, which is different from the AF magnetic substance 215 of FIG. 2. The stepped structures 315a3 and 315b3 may reduce a distance between the AF magnetic substance 315 and the AF position sensor 320.

According to certain embodiments, the first part 315a may include a first magnet bonding part 315a1, the first stepped structure 315a3, and a first extension part 315a2 extending from the first stepped structure 315a3, and oriented to face the AF position sensor 320. Each of the first magnet bonding part 315a1 and the first extension part 315a2 may have a planar shape. The first stepped structure 315a3, which is in a stepped shape, may connect the first magnet bonding part 315a1 to the first extension part 315a2. The first stepped structure 315a3 may more reduce the distance between the first extension part 315a2 and the AF position sensor 320, as compared to that as in FIG. 2.

Similarly, the second part 315b may include a second magnet bonding part 315b1, the second stepped structure 315b3, and the second extension part 315b2 extending from the second stepped structure 315b3 to face the AF position sensor 320. Each of the second magnet bonding part 315b1 and the second extension part 315b2 may have a planar shape. The second stepped structure 315b3, which is in a stepped shape, may connect the second magnet bonding part 315b1 to the second extension part 315b2. The second stepped structure 315b3 may more reduce the distance between the second extension part 315b2 and the AF position sensor 320, as compared to that as in FIG. 2.

Figure 4:
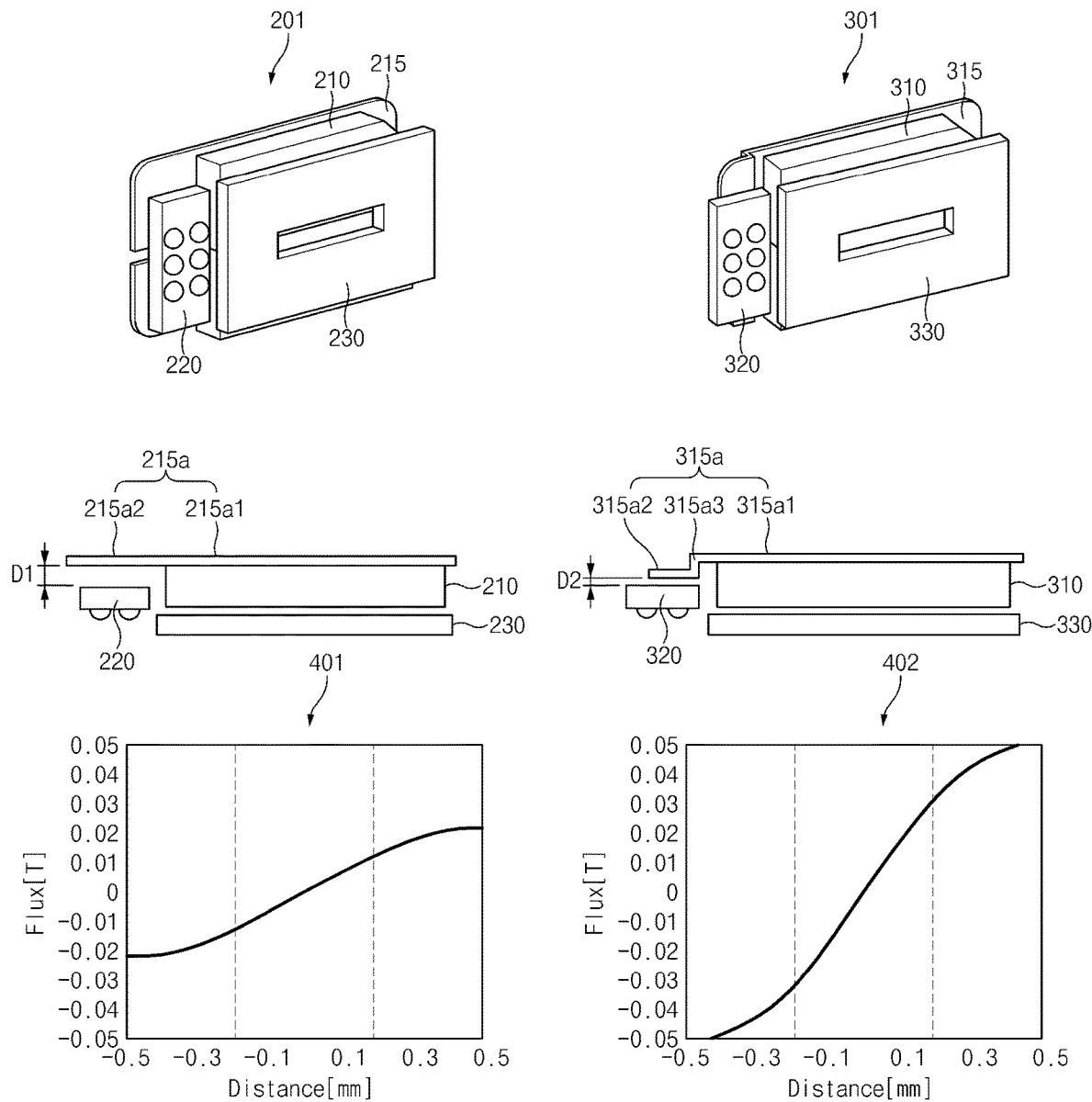
FIG. 4 illustrates the variation in magnetic flux as a function of the distance between a magnetic member and a position sensor, according to certain embodiments.

FIG. 4 illustrates the variation in magnetic flux as a function of the distance between a magnetic member and a position sensor, according to certain embodiments.

Referring to FIG. 4, the AF driving unit 201, which is of a first type, may include the AF magnetic member 210, the AF magnetic substance 215, the AF position sensor 220, and the AF coil 230. The AF magnetic substance 215 of the AF driving unit 201, which is of the first type, may have a planar shape. A first distance D1 may be formed between the AF position sensor 220 and the first extension part 215a2 of the AF magnetic substance 215.

In first graph 401, the magnetic flux sensed by the AF position sensor 220 may vary linearly in a specified section (e.g., the section of −0.1 mm to +0.1 mm) depending on the distance of the AF magnetic substance 215 and the AF position sensor 220. When a portion (e.g., the first extension part 215a2) of the AF magnetic substance 215 is disposed to face the AF position sensor 220, the magnetic flux of the AF magnetic substance 215 propagates through the portion, so the reception sensibility for the magnetic flux of the AF position sensor 220 may be improved.

The AF driving unit 301, which is of a second type, may include the AF magnetic member 310, the AF magnetic substance 315, the AF position sensor 320, and the AF coil 330. The AF magnetic substance 315 of the AF driving unit 301, which is of the second type, may have a stepped shape. The AF magnetic substance 315 may include the stepped structure 315a3. The stepped structure 315a3, which is in the stepped shape, may connect the first magnet bonding part 315a1 to the first extension part 315a2. A second distance D2, which is shorter than the first distance D1, may be formed between the AF position sensor 320 and the first extension part 315a2 of the AF magnetic substance 315.

In second graph 402, the magnetic flux sensed by the AF position sensor 320 may vary linearly in a specified section (e.g., the section of −0.1 mm to +0.1 mm) depending on the distance of the AF magnetic substance 315 and the AF position sensor 320. When a portion (e.g., the first extension part 315a2) of the AF magnetic substance 315 is disposed to face the AF position sensor 320, the magnetic flux of the AF magnetic substance 315 propagates through the portion, so the reception sensibility for the magnetic flux of the AF position sensor 320 may be improved. In addition, when the distance between the portion (e.g., the first extension part 315a2) of the AF magnetic substance 315 and the AF position sensor 320 is reduced by the stepped structure (e.g., a stepped structure 315a3), the reception sensibility for the magnetic flux of the AF position sensor 320 may be improved.

Figure 5:
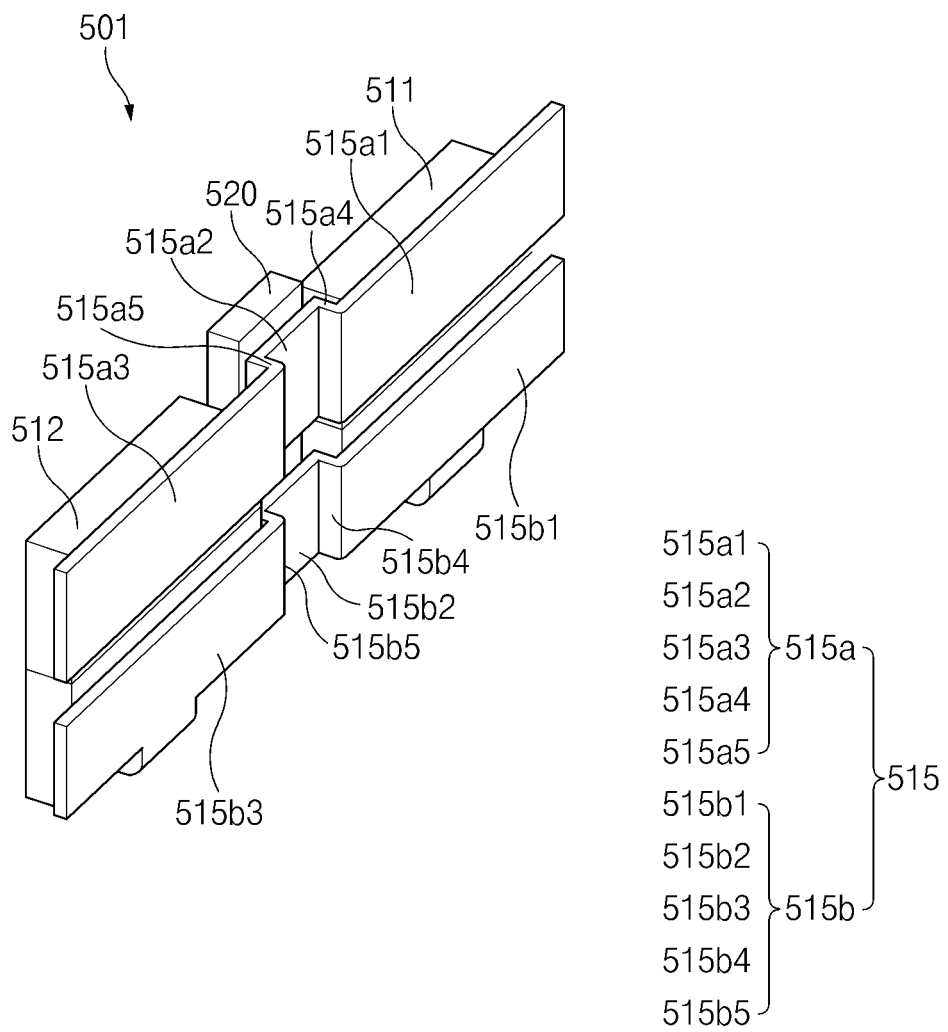
FIG. 5 illustrates the form of an AF module including a plurality of magnetic members, according to certain embodiments.
Figure 5:
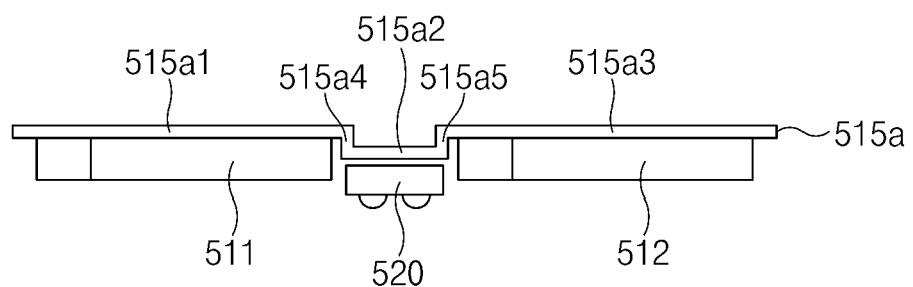

FIG. 5 illustrates the form of an AF module including a plurality of magnetic members, according to certain embodiments.

Referring to FIG. 5, a AF driving unit 501 may include a first AF magnetic member 511, a second AF magnetic member 512, an AF magnetic substance 515, an AF position sensor 520, a first AF coil (not illustrated), and a second AF coil (not illustrated).

The first AF coil and the second AF coil may be disposed on first surfaces of the first AF magnetic member 511 and the second AF magnetic member 512, and the AF magnetic substance (e.g., yoke) 515 may include a stepped structure and be disposed on second surfaces of the first AF magnetic member 511 and the second AF magnetic member 512.

The AF position sensor (e.g., the hall sensor) 520 may detect a variation in magnetic flux generated by the first AF magnetic member 511 and the second AF magnetic member 512 and convert the variation into the electrical signal. The AF position sensor 520 may be used to detect the positions of the first AF magnetic member 511 and the second AF magnetic member 512. The AF position sensor 520 may be interposed between the first AF magnetic member 511 and the second AF magnetic member 512.

The AF magnetic substance 515 may be implemented with a ferromagnetic substance (e.g., metal) that can be magnetized by the first AF magnetic member 511 and the second AF magnetic member 512. The AF magnetic substance 515 may improve the reception sensitivity for the magnetic flux of the AF position sensor 520.

According to an embodiment, the AF magnetic substance 515 may include a first part 515a connected to first poles (e.g., N poles) of the first AF magnetic member 511 and the second AF magnetic member 512, and a second part 515b connected to second poles (e.g., S poles) of the first AF magnetic member 511 and the second AF magnetic member 512. The first part 515a may include first magnetic bonding parts 515a1 and 515a3, a first extension part 515a2, and first protrusion structures 515a4 and 515a5. The second part 515b may include second magnetic bonding parts 515b1 and 515b3, a second extension part 515b2, and second protrusion structures 515b4 and 515b5.

The AF magnetic substance 515 may include protrusion structures 515a4, 515a5, 515b4, and 515b5 formed on at least a portion thereof. The protrusion structures 515a4, 515a5, 515b4, and 515b5 may reduce a distance between the AF magnetic substance 515 and the AF position sensor 520.

The first extension part 515a2 may protrude toward the AF position sensor 520 by the first protrusion structures 515a4 and 515a5. The second extension part 515b2 may protrude toward the AF position sensor 520 by the second protrusion structures 515b4 and 515b5.

Figure 6:
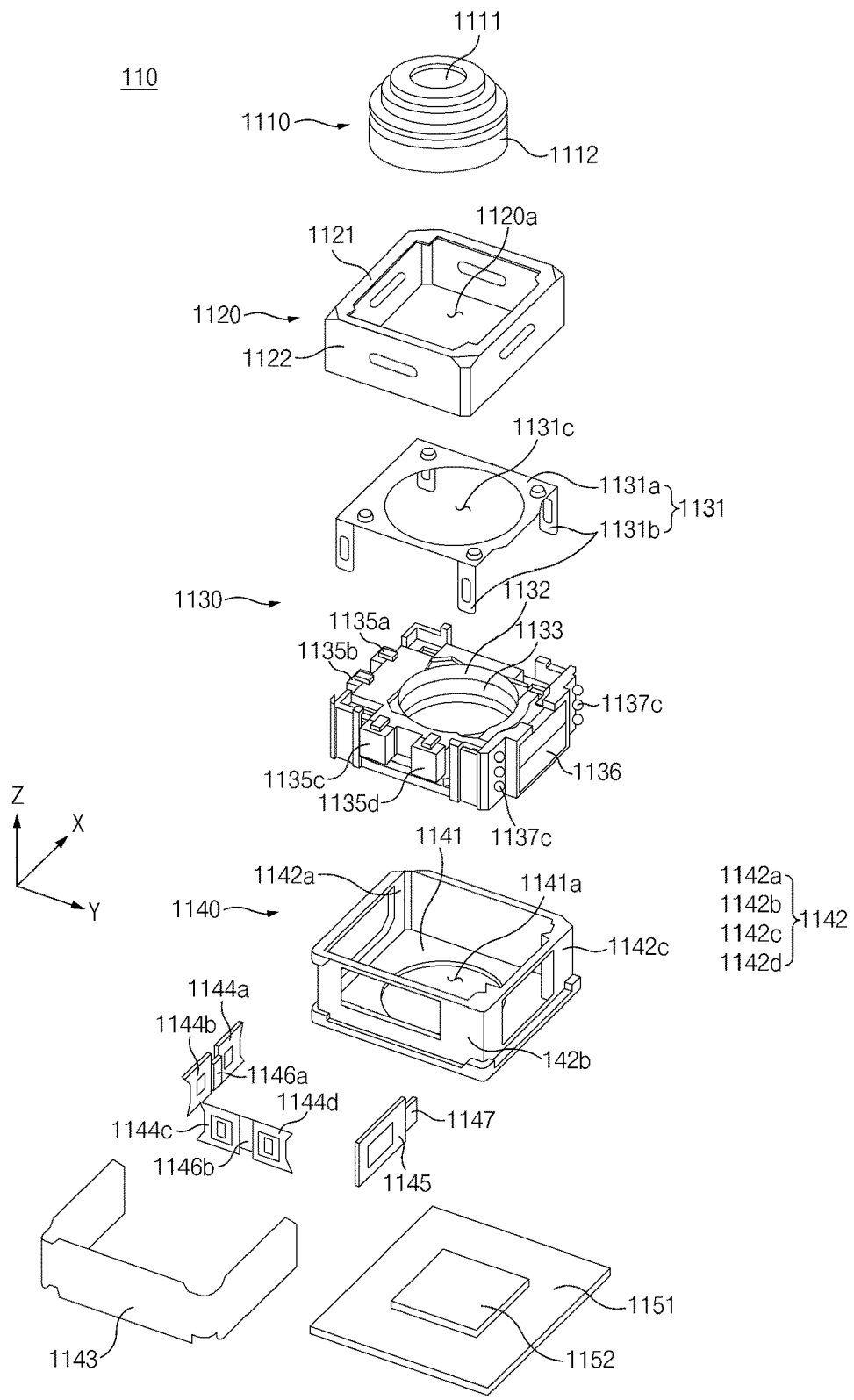
FIG. 6 is an exploded perspective view illustrating a camera module, according to an embodiment.
Figure 7A:
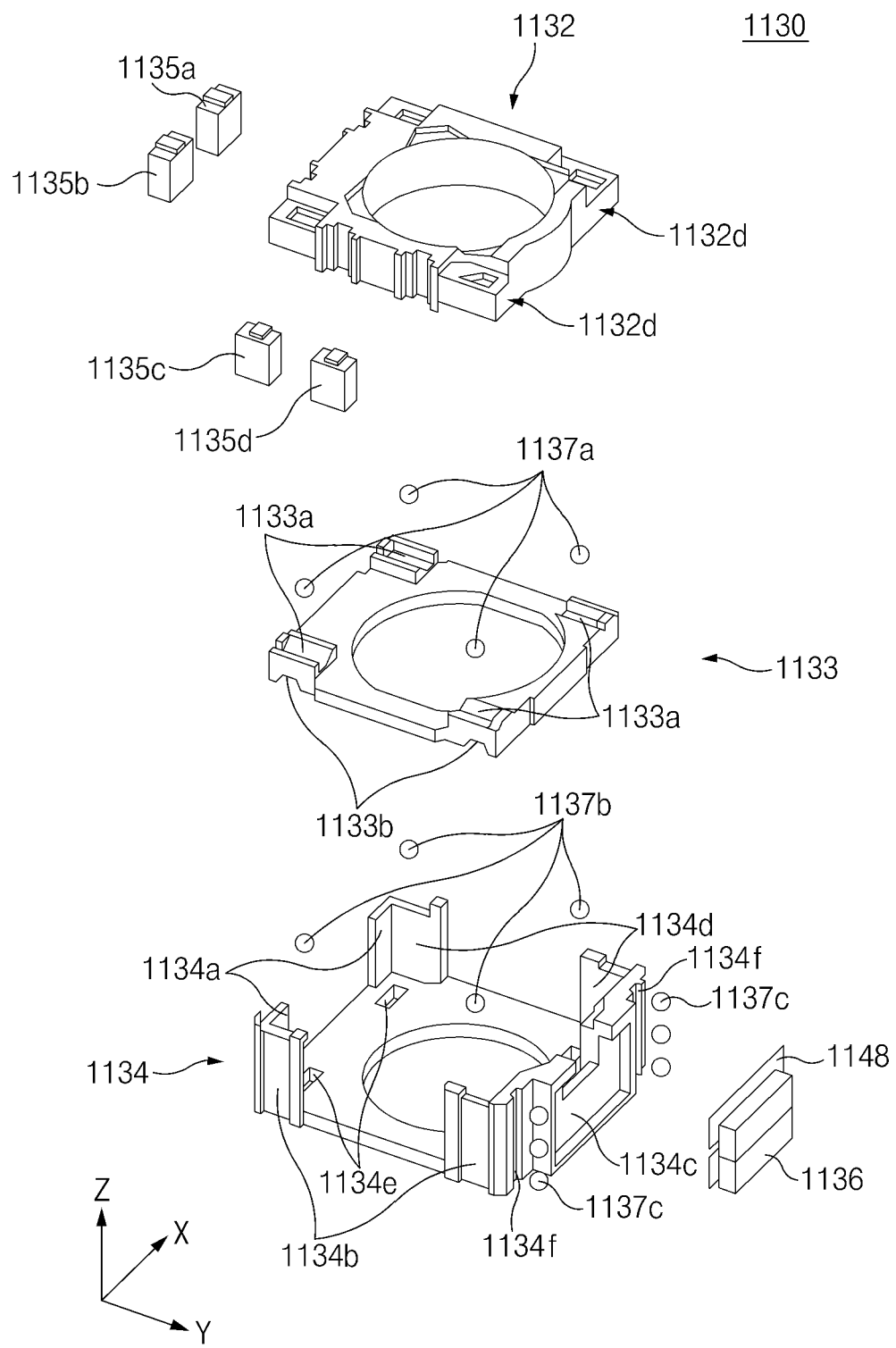
FIG. 7A is an exploded perspective view illustrating a driving assembly illustrated in FIG. 6, when viewed in one direction.
Figure 7B:
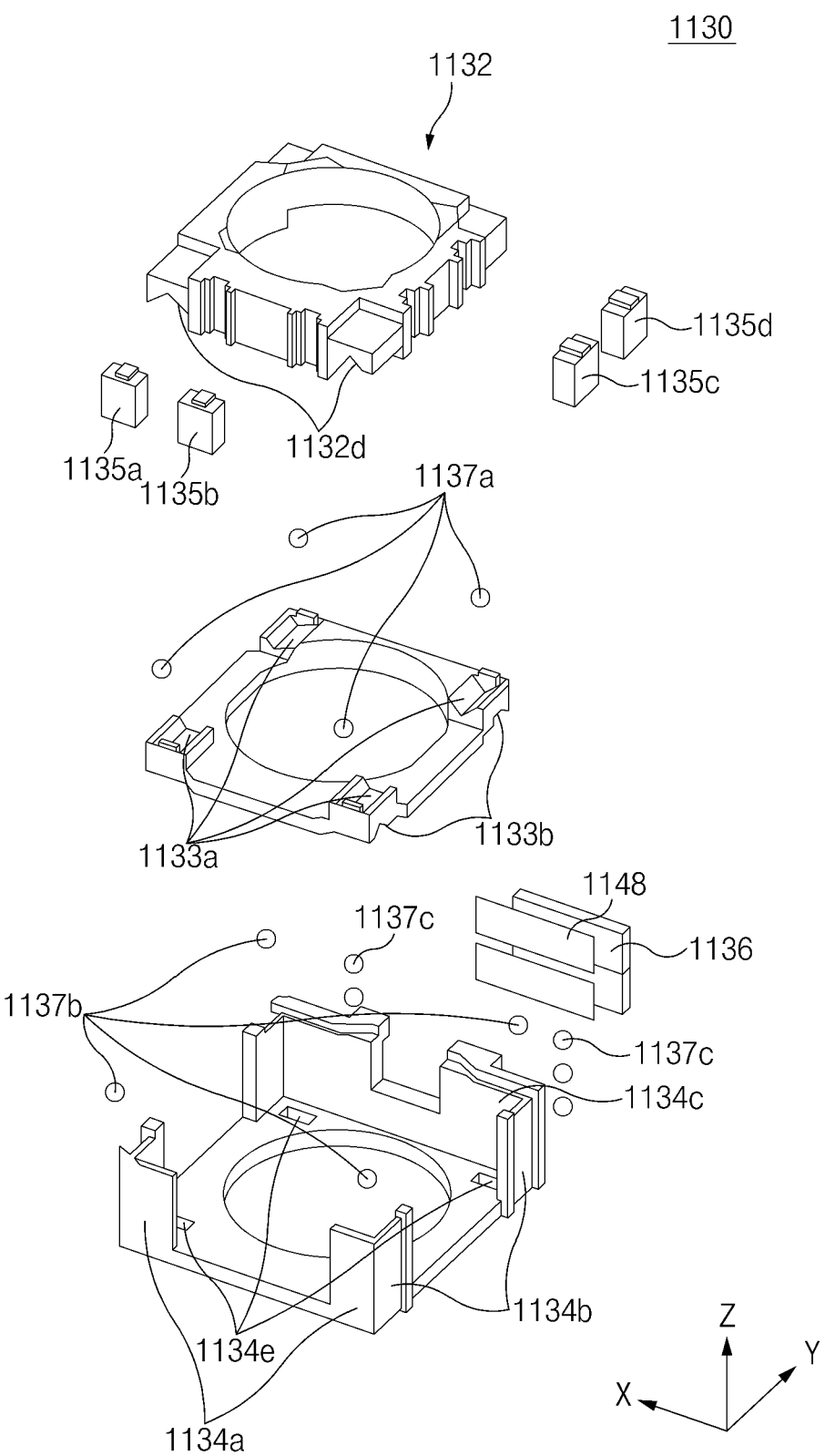
FIG. 7B is an exploded perspective view illustrating a driving assembly illustrated in FIG. 6, when viewed in a direction different from the direction of FIG. 7A.
Figure 8C:
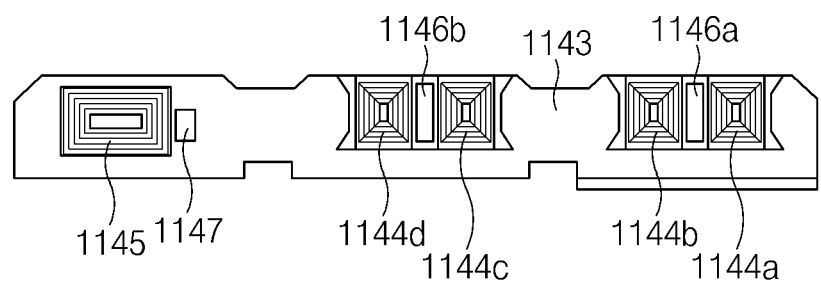
FIG. 8C is a view illustrating a printed circuit board, a coil, and a position sensor illustrated in FIG. 1.
Figure 9:
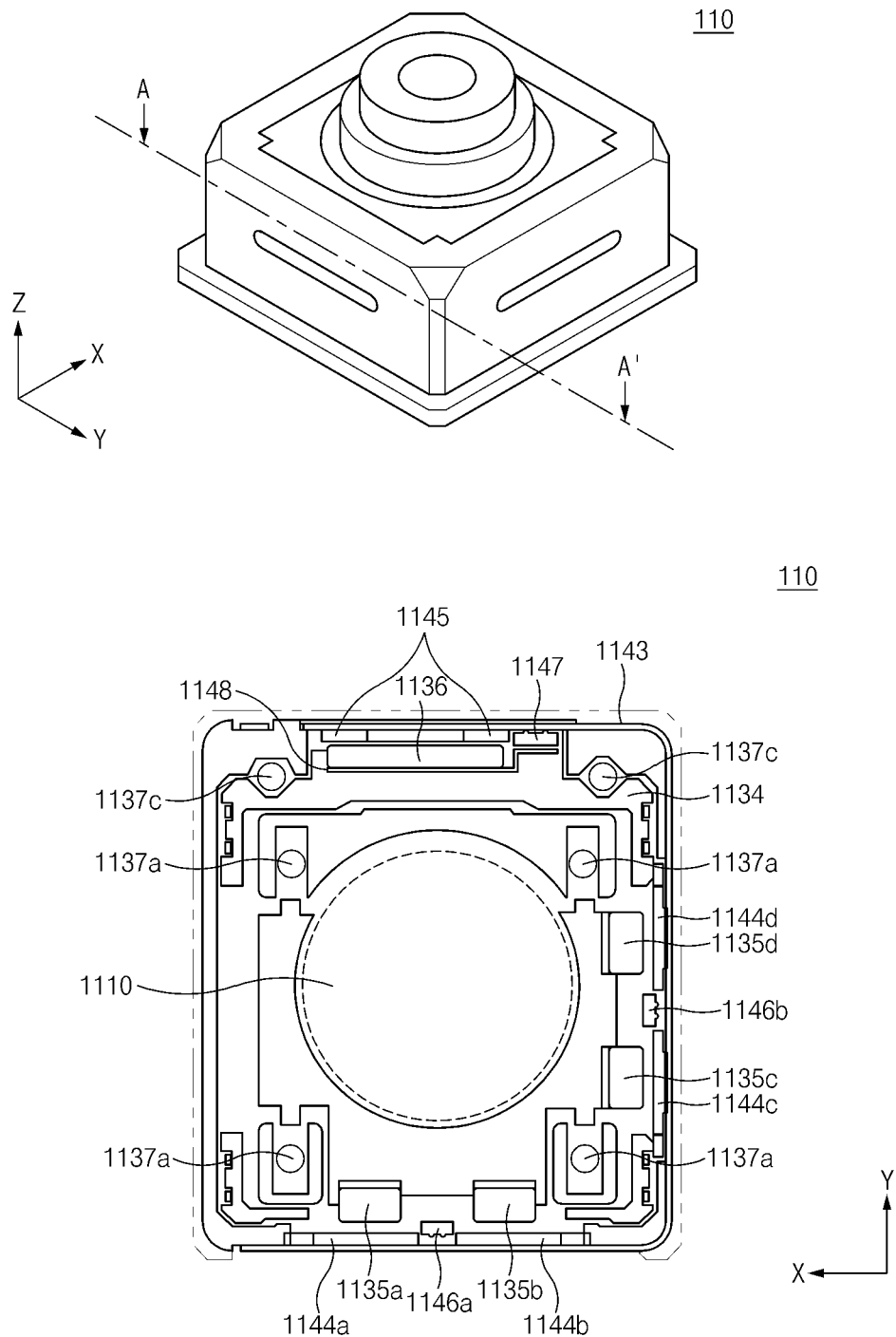
FIG. 9 is a sectional view of a camera module.

FIG. 6 is an exploded perspective view illustrating a camera module, according to an embodiment. FIG. 7A is an exploded perspective view illustrating a driving assembly illustrated in FIG. 6, when viewed in one direction. FIG. 7B is an exploded perspective view illustrating a driving assembly illustrated in FIG. 6, when viewed in a direction different from the direction of FIG. 7A. FIG. 8A is an exploded perspective view illustrating a housing assembly illustrated in FIG. 6, when viewed in one direction. FIG. 8B is an exploded perspective view illustrating a housing assembly illustrated in FIG. 6, when viewed in a direction different from the direction of FIG. 8A. FIG. 8C is a view illustrating a printed circuit board, a coil, and a position sensor illustrated in FIG. 1. FIG. 9 is a sectional view taken along line A-A' of a camera module illustrated in FIG. 6.

Referring to FIGS. 6 to 9, the camera module 150 may include a lens assembly 1110, a shield can 1120, a driving assembly 1130, and a housing assembly 1140.

According to an embodiment, the lens assembly 1110 may include a lens 1111 and a lens barrel 1112. For example, the lens 1111 may collect light incident from the exterior environment and transmit the light to an image sensor 1152 disposed under the lens barrel 1112. The lens 1111 may include one lens or a plurality of lenses. The lens 1111 may be fixed to one side of the lens barrel 1112. The lens barrel 1112 may surround the lens 1111 seated thereon and may provide an optical path to transmit light, which is incident through the lens 1111, to the image sensor 1152. In this regard, the central portion of the lens barrel 1112 may include a hollow, and the lower portion of the lens barrel 1112 may be opened to expose the image sensor 1152. An upper portion of the lens barrel 1112 may be provided in the shape corresponding to the shape of the lens 1111. The lens barrel 1112 may be seated and fixed inside the driving assembly 1130. As the driving assembly 1130 moves, the lens assembly 1110 (or the lens barrel 1112 and the lens 1111) may move According to an embodiment, the shield can 1120 may be provided in a shape so as to cover a camera module 110, in a downward direction from the top (e.g., relative to the orientation depicted in FIG. 6). For example, the shield can 1120 may include a top surface 1121 (a face facing a positive z axis direction) and shield can sidewalls 1122 disposed at edges of the top surface 1121, and a bottom surface of the shield can 1120 may be provided in an open type. A shield can hole 1120a having a specific size may be defined in the top surface 1121 of the shield can 1120 to expose at least a portion of the lens 1111. In addition, the shield can hole 1120a may be provided to be larger than an aperture module. The shield can sidewalls 1122 may be coupled to an edge of the housing assembly 1140 of the camera module 110 to protect or fix components (e.g., the lens assembly 1110, the driving assembly 1130, and the housing assembly 1140) seated in the camera module 110. The shield can 1120 may be formed of, for example, a metal material or a material (e.g., a metal material or tempered plastic) having hardness having a specific size or more.

According to an embodiment, the driving assembly 1130 may include a first carrier 1132 (e.g., an OIS carrier) and a second carrier 1134 (e.g., an AF carrier). For example, the first carrier 1132 may include a hollow therein such that the lens barrel 1112 is disposed within the hollow. A first magnetic member 1135a, a second magnetic member 1135b, a third magnetic member 1135c, and a fourth magnetic member 1135d (e.g., the OIS magnetic member) may be disposed on at least two outer portions of the first carrier 1132. For example, the first magnetic member 1135a and the second magnetic member 1135b may be disposed on one outer portion of the first carrier 1132. The third magnetic member 1135c and the fourth magnetic member 1135d may be disposed on another outer portion. The at least two outer portions may share a corner.

According to an embodiment, the driving assembly 1130 may include a cover 1131 (or the OIS cover). For example, the cover 1131 may be provided in the shape so as to cover the driving assembly 1130 downward from the top (e.g., relative to the orientation depicted in FIG. 6). The cover 1131 may prevent the first carrier 1132 from deviating from the second carrier 1134. In this regard, the cover 1131 may include an upper board 1131a and leads 1131b. The upper board 1131a, which has the shape of a cylindrical band or a polygonal band (e.g., a rectangular band) hollowed at the central portion thereof, may include a cover hole 1131c provided in a specific size at the central portion thereof such that at least a portion of the lens 1111 is exposed. The leads 1131b may be formed with a specific length and a specific width while extending right downward from one side (e.g., corner areas) of the upper board 1131a. According to an embodiment, the leads 1131b may be provided in the shape of a band which is hollowed, and may be coupled to one side of the second carrier 1134.

According to an embodiment, the first carrier 1132 may be seated on the central portion of the second carrier 1134. For example, the first carrier 1132 may be movable in an X-axis or Y-axis direction inside the second carrier 1134. The second carrier 1134 may include one or more carrier sidewalls 1134a, 1134b, 1134c, and 1134d. For example, the second carrier 1134 may include the first carrier sidewall 1134a formed to expose the first magnetic member 1135a and the second magnetic member 1135b operating such that the first carrier 1132 having the lens barrel 1112 seated thereon moves in the X-axis direction, and the second carrier sidewall 1134b formed to expose the third magnetic member 1135c and the fourth magnetic member 1135d operating such that the first carrier 1132 having the lens barrel 1112 seated thereon moves in the Y-axis direction. Alternatively, the second carrier 1134 may include the third carrier sidewall 1134c provided at the outer portion thereof with an AF magnetic member 1136 used to move the lens assembly 1110 in a Z-axis direction. Alternatively, the second carrier 1134 may include the fourth carrier sidewall 1134d.

According to an embodiment, the first magnetic member 1135a, the second magnetic member 1135b, the third magnetic member 1135c, and the fourth magnetic member 1135d for the OIS may be used as a pair with coils (e.g., a first coil 1144a, a second coil 1144b, a third coil 1144c, and a fourth coil 1144d) disposed in the housing assembly 1140 and associated with the OIS. For example, the first magnetic member 1135a, and the second magnetic member 1135b may be used to move the first carrier 1132 having the lens barrel 1112 fixed thereto in the X-axis direction (or one direction of a horizontal axis when an upper direction in which the shield can 1120 is disposed is defined as a vertical axis). For example, the third magnetic member 1135c, and the fourth magnetic member 1135d may be used to move the first carrier 1132 having the lens barrel 1112 fixed thereto in the Y-axis direction (or another direction of a horizontal axis when an upper direction in which the shield can 1120 is disposed is defined as a vertical axis).

According to an embodiment, the driving assembly 1130 may include a guide member 1133 and guide balls 1137a and 1137b to guide and support the movement of the first carrier 1132. For example, first guide balls 1137a may be interposed between the first carrier 1132 and the guide member 1133. The first carrier 1132 may reciprocate in the X-axis direction (or Y-axis direction) through the first guide balls 1137a. For example, second guide balls 1137b may be interposed between the guide member 1133 and the second carrier 1134. The guide member 1133 may reciprocate in the Y-axis direction (or the X-axis direction) through the second guide balls 1137b, so the first carrier 1132 may reciprocate in the Y-axis direction (or the X-axis direction). The first carrier 1132, the guide member 1133, and the second carrier 1134 may have guide grooves 1132d, 1133a, 1133b, and 1134e formed therein to receive the guide balls 1137a and 1137b. For example, the guide grooves 1132d, 1133a, 1133b, and 1134e extend in a specified direction (e.g., the X-axis direction or the Y-axis direction) and may have V-shaped sectional surfaces. The guide grooves 1132d, 1133a, 1133b, and 1134e restrict the first carrier 1132 from moving in a direction other than the specified direction (e.g., the X-axis direction or the Y-axis direction. When the first carrier 1132 reciprocates in the X-axis direction or the Y-axis direction, the guide balls 1137a and 1137b may perform rolling in the guide grooves 1132d, 1133a, 1133b, and 1134e

According to an embodiment, AF guide grooves 1134f and AF guide balls 1137c may be provided in at least one sidewall (e.g., the third carrier sidewall 1134c) of the second carrier 1134, to guide and support the movement of the second carrier 1134. For example, the AF guide grooves 1134f may restrict the second carrier 1134 from moving in a specified direction (e.g., the Z-axis direction) in the housing assembly 1140. The AF guide grooves 1134f may extend in the specified direction (e.g., a Z-axis direction), and may have a V-shaped sectional surfaces. When the second carrier 1134 reciprocates in a specified direction (e.g., in the Z-axis direction), the AF guide balls 1137c may perform rolling in the AF guide grooves 1134f.

According to an embodiment, the housing assembly 1140 may include a seating part 1141, on which the above-components (e.g., the lens assembly 1110 and the driving assembly 1130) are seated, and housing sidewalls 1142 disposed to surround the above-components. For example, the seating part 1141 may include a seating part hole 1141a provided in the center thereof to expose the central portion of the lens assembly 1110 downward. The image sensor 1152 may be disposed, for example, under the seating part hole 1141a. The housing sidewalls 1142 may be disposed while sharing each corner between edges of the seating part 1141. The housing sidewalls 1142 may include, for example, a first housing sidewall 1142a disposed with the first coil 1144a and the second coil 1144b mutually operated with the first magnetic member 1135a and the second magnetic member 1135b disposed of the first carrier 1132 such that the lens assembly 1110 moves in the X-axis direction, a second housing sidewall 1142b disposed with a third coil 1144c and a fourth coil 1144d mutually operated with the third magnetic member 1135c and the fourth magnetic member 1135d disposed of the first carrier 1132 such that the lens assembly 1110 moves in the Y-axis direction, a third housing sidewall 1142c disposed with an AF coil 1145 mutually operated with the AF magnetic member 1136 disposed such that the lens assembly 1110 moves in the Z-axis direction, and a fourth housing sidewall 1142d.

According to an embodiment, an AF magnetic substance 1148 may be attached to the AF magnetic member 1136. At least a portion of the AF magnetic substance 1148 may extend to face an AF position sensor 1147. The AF magnetic substance 1148 may improve the reception sensitivity for the magnetic flux of the AF position sensor 1147.

According to an embodiment, the housing sidewalls 1142 may be coupled to the shield can sidewalls 1122 to protect the above-described components associated with the camera module therein. For example, a first position sensor 1146a, a second position sensor 1146b, and the AF position sensor 1147 (e.g., hall sensor) may be disposed on the housing sidewalls 1142. The first position sensor 1146a may collect sensor information generated depending on the X-axis movement of the lens assembly 1110 (or the first carrier 1132). The second position sensor 1146b may collect sensor information generated depending on the Y-axis movement of the lens assembly 1110 (or the first carrier 1132). The AF position sensor 1147 may collect sensor information generated depending on the Z-axis movement of the lens assembly 1110 (or the second carrier 1134). The first position sensor 1146a, the second position sensor 1146b, and the AF position sensor 1147 are electrically connected to a printed circuit board 1143 (e.g., a flexible printed circuit board (FPCB)), and the collected sensor information may be transmitted to a first processor (e.g., a control circuit) of the camera module 110 or a second processor (e.g., AP) of an electronic device through the printed circuit board 1143. For example, the first processor may be connected to a sensor board 1151.

According to an embodiment, the printed circuit board 1143 may supply a signal (e.g., a current) to the coils 1144a, 1144b, 1144c, 1144d, and 1145 disposed in the housing assembly 1140. For example, the printed circuit board 1143 may be connected to a first processor (or a control circuit) related to driving of the camera module 110 or a second processor of an electronic device on which the camera module 110 is mounted. The printed circuit board 1143 may supply a signal (e.g., a current of a specified intensity) of a specified intensity to at least one of the coils 1144a, 1144b, 1144c, 1144d, and 1145 included in the housing assembly 1140, under the control of at least one of the first processor and the second processor. According to certain embodiments, the printed circuit board 1143 may receive a sensing value from each of the position sensors 1146a, 1146b, and 1147 disposed in the housing assembly 1140, and transmit a corresponding signal to each of the coils 1144a, 1144b, 1144c, 1144d, and 1145.

According to an embodiment, the camera module 110 may include the image sensor 1152 (e.g., a memory device) to collect an image. For example, the image sensor 1152 may be disposed to face the lens 1111 through the seating part hole 1141a disposed under the housing assembly 1140. The image sensor 1152 may be disposed on the sensor board 1151.

Figure 10:
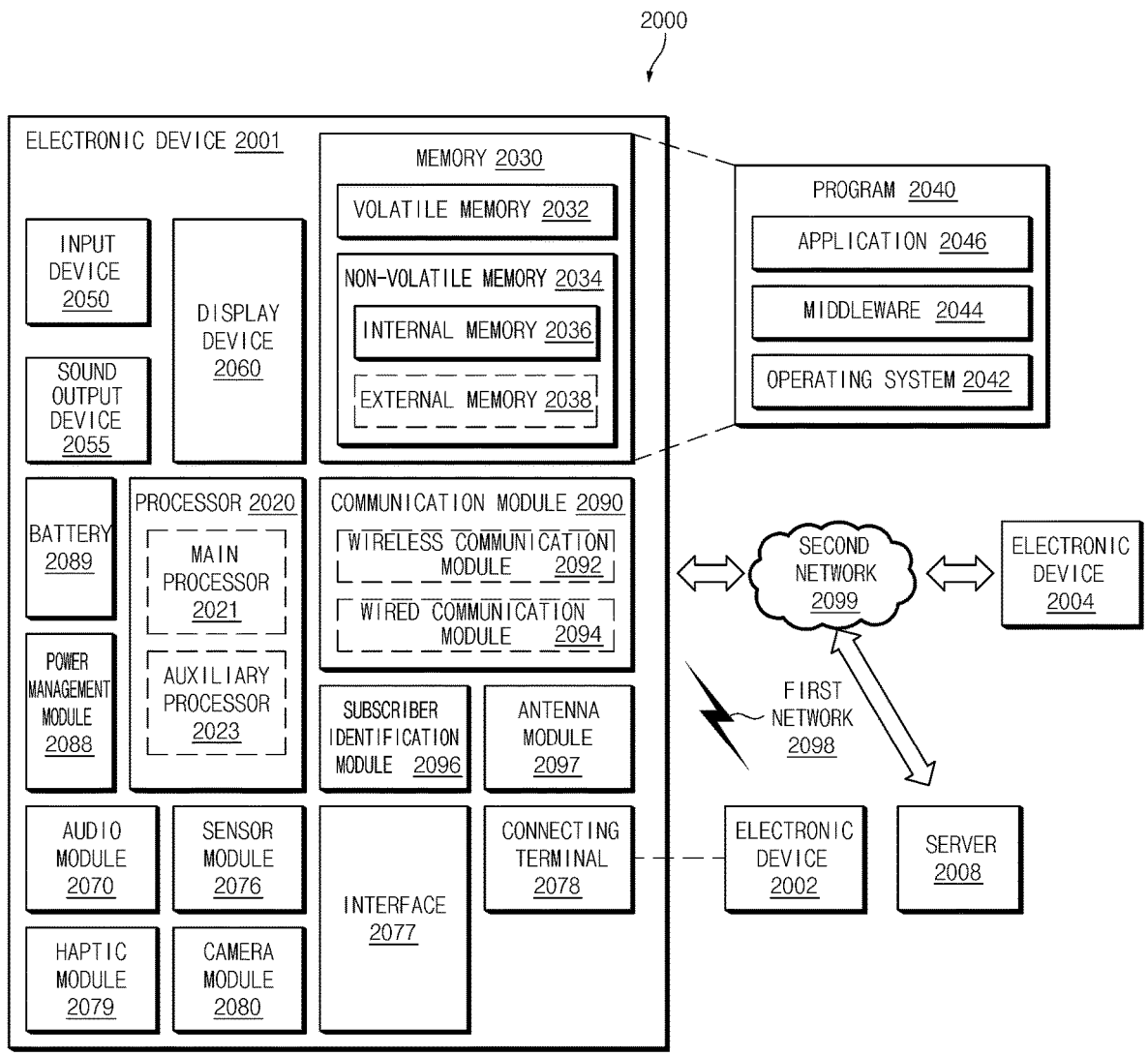
FIG. 10 illustrates an electronic device under a network environment, according to certain embodiments.

FIG. 10 illustrates a block diagram of an electronic device 2001 (e.g., the electronic device 101 of FIG. 1) in a network environment 2000, according to certain embodiments.

Referring to FIG. 10, the electronic device 2001 in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which may be operated independently of or together with the main processor 2021. Additionally or alternatively, the auxiliary processor 2023 may be configured to use lower power than the main processor 2021 or to be specialized for a specified function. The auxiliary processor 2023 may be implemented separately from the main processor 2021 or may be implemented as a part of the main processor 2021.

The auxiliary processor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the auxiliary processor 2023 (e.g., an image signal processor or a communication processor) may be implemented as a part of any other component (e.g., the camera module 2080 or the communication module 2090) which is functionally (or operatively) associated with the auxiliary processor 2023.

The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 2092 may verify and authenticate the electronic device 2001 within a communication network, such as the first network 2098 or the second network 2099, by using subscriber information (e.g., international mobile subscriber identity (IMSI)) stored in the subscriber identification module 2096.

The antenna module 2097 may transmit a signal or a power to the outside (e.g., an external electronic device) or may receive a signal or a power from the outside. According to an embodiment, the antenna module 2097 may include one or more antennas, and at least one antenna which is suitable for a communication scheme used in a computer network such as the first network 2098 or the second network 2099 may be selected, for example, by the communication module 2090 from the one or more antennas. The signal or power may be exchanged between the communication module 2090 and an external electronic device through the selected at least one antenna or may be received from the external electronic device through the selected at least one antenna and the communication module 2090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance.

The electronic device according to an embodiment of the disclosure should not be limited to the above-mentioned devices.

According to certain embodiments, an electronic device (e.g., the electronic device 101 of FIG. 1) may include a housing including an opening, and a camera module including at least a portion exposed to an outside through the opening. The camera module may include a lens unit, and an image sensor that converts light introduced through the lens unit into an electrical signal, a magnetic member, a coil unit disposed on a first surface of the magnetic member to face the magnetic member, a magnetic substance unit attached to a second surface of the magnetic member, and a position sensor disposed to be adjacent to the magnetic member to face at least a portion of the magnetic substance part.

According to certain embodiments, the position sensor may be disposed to be adjacent to a side surface of the magnetic member perpendicular to the first surface or the second surface.

According to certain embodiments, the lens unit may reciprocate in a direction parallel to the first surface or the second surface by electromagnetic force generated by the magnetic member and the coil unit.

According to an embodiment, the magnetic substance unit may be in the planar shape. According to another embodiment, the magnetic substance unit may include a steeped structure. The stepped structure may be formed in an area, which corresponds to a space between the magnetic member and the position sensor, of the magnetic substance unit. The stepped structure may be formed to allow the at least a portion of the magnetic substance unit to protrude toward the position sensor.

According to certain embodiments, the position sensor may sense a magnetic flux propagating through the magnetic member or the magnetic substance unit. The position sensor may include a sensing surface disposed in parallel to the first surface or the second surface.

According to certain embodiments, the magnetic substance unit may include a first part attached to a first pole of the magnetic member, and a second part attached to a second pole of the second magnetic member. The first part may include a first stepped structure, and the second part may include a second stepped structure. The first stepped structure and the second stepped structure may have equal heights.

According to certain embodiments, the position sensor may be a hall sensor.

According to certain embodiments, an electronic device may include a housing including an opening and a camera module including at least a portion exposed to an outside through the opening. The camera module may include a lens unit, an image sensor that converts light introduced through the lens unit into an electrical signal, a first magnetic member, a second magnetic member, a first coil unit disposed on a first surface of the first magnetic member to face the first magnetic member, a second coil unit disposed on a first surface of the second magnetic member to face the second magnetic member, a magnetic substance unit attached to a second surface of the first magnetic member and a second surface of the second magnetic member, and a position sensor interposed between the first magnetic member and the second magnetic member to face at least a portion of the magnetic substance unit.

According to certain embodiments, the magnetic substance unit may include a first part attached to a first pole of the first magnetic member and a first pole of the second magnetic member and a second part attached to a second pole of the first magnetic member and a second pole of the second magnetic member. The first part may include a first protruding structure, and the second part may include a second protruding structure.

According to certain embodiments, the at least a portion of the magnetic substance unit may be of the first protruding structure or the second protruding structure.

According to certain embodiments, the camera module may include a lens unit, an image sensor that converts light introduced through the lens unit into an electrical signal, a magnetic member, a coil unit disposed on a first surface of the magnetic member to face the magnetic member, a magnetic substance unit attached to a second surface of the magnetic member, and a position sensor disposed to be adjacent to the magnetic member to face at least a portion of the magnetic substance part.

According to certain embodiments, the position sensor may be disposed to be adjacent to a side surface of the magnetic member perpendicular to the first surface or the second surface.

According to certain embodiments, the magnetic substance unit may include a first part attached to a first pole of the magnetic member, and a second part attached to a second pole of the magnetic member.

It should be understood that certain embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Certain embodiments of the disclosure may be implemented by software (e.g., the program 2040) including an instruction stored in a machine-readable storage medium (e.g., an internal memory 2036 or an external memory 2038) readable by a machine (e.g., the electronic device 2001). For example, the processor (e.g., the processor 2020) of a machine (e.g., the electronic device 2001) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one or plural entities. According to certain embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to certain embodiments, operations performed by a module, a programming, or other components may be executed sequentially, in parallel, repeatedly, or in a heuristic method, or at least some operations may be executed in different sequences, omitted, or other operations may be added.

According to certain embodiments disclosed herein, the electronic device may reduce the size of the camera module by changing the structure in which the position sensor included in the camera module is disposed.

According to certain embodiments disclosed herein, the electronic device may improve the reception sensitivity for the magnetic flux of the position sensor, as a ferromagnetic substance (e.g., yoke) attached to the magnetic member in the camera module is expanded to face the position sensor.

According to certain embodiments disclosed herein, the electronic device may include the ferromagnetic substance (e.g., yoke) attached to the magnetic member in the camera module and having a stepped structure. The ferromagnetic substance (e.g., yoke) may become closer to the position sensor through the stepped structure, and the reception sensitivity for the magnetic flux of the position sensor may be improved.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
a housing including an opening; and
a camera module at least partially exposed to an exterior environment of the electronic device through the opening,
wherein the camera module includes:
a lens unit,
an image sensor configured to convert light received through the lens unit into an electrical signal,
a magnetic member,
a coil unit disposed on a first surface of the magnetic member and oriented to face the magnetic member,
a magnetic substance unit coupled to a second surface of the magnetic member, the second surface opposite to and discontiguous with the first surface, and
a position sensor disposed adjacent to the magnetic member and oriented to face at least a portion of the magnetic substance unit.

2. The electronic device of claim 1, wherein the position sensor is disposed adjacent to a side surface of the magnetic member, and
wherein the side surface is perpendicular to the first surface or the second surface.

3. The electronic device of claim 1, wherein the lens unit is configured to move reciprocally in a direction parallel to the first surface or the second surface by electromagnetic force generated by the magnetic member and the coil unit.

4. The electronic device of claim 1, wherein the magnetic substance unit includes a planar shape.

5. The electronic device of claim 1, wherein the magnetic substance unit includes a stepped structure.

6. The electronic device of claim 5, wherein the stepped structure is formed in an area corresponding to a space within the magnetic substance unit, enclosed between the magnetic member and the position sensor.

7. The electronic device of claim 5, wherein the stepped structure allows the at least the portion of the magnetic substance unit to protrude toward the position sensor.

8. The electronic device of claim 1, wherein the position sensor is configured to detect a magnetic flux propagating through the magnetic member or the magnetic substance unit.

9. The electronic device of claim 1, wherein the position sensor includes a sensing surface disposed parallel to one of the first surface or the second surface.

10. The electronic device of claim 1, wherein the magnetic substance unit includes:
a first part coupled to a first pole of the magnetic member; and
a second part coupled to a second pole of the magnetic member.

11. The electronic device of claim 10, whereof the first part includes a first stepped structure, and
wherein the second part includes a second stepped structure.

12. The electronic device of claim 11, whereof the first stepped structure and the second stepped structure have equal heights.

13. The electronic device of claim 1, wherein the position sensor includes a hall sensor.

14. An electronic device, comprising:
a housing including an opening; and
a camera module that is at least partially exposed to an exterior of the electronic device through the opening,
wherein the camera module includes:
a lens unit;

an image sensor configured to convert light received through the lens unit into an electrical signal;

a first magnetic member;

a second magnetic member;

a first coil unit disposed on a first surface of the first magnetic member and oriented to face the first magnetic member;

a second coil unit disposed on a first surface of the second magnetic member and oriented to face the second magnetic member;

a magnetic substance unit coupled to a second surface of the first magnetic member and a second surface of the second magnetic member; and a position sensor interposed between the first magnetic member and the second magnetic member, and oriented to face at least a portion of the magnetic substance unit.

15. The electronic device of claim 14, wherein the magnetic substance unit includes:

a first part coupled to a first pole of the first magnetic member and a first pole of the second magnetic member; and a second part coupled to a second pole of the first magnetic member and a second pole of the second magnetic member.

16. The electronic device of claim 15, whereof the first part includes a first protruding structure, and wherein the second part includes a second protruding structure.

17. The electronic device of claim 16, wherein the at least a portion of the magnetic substance unit is included of the first protruding structure or the second protruding structure.

18. A camera module, comprising:

a lens unit;

an image sensor configured to convert light received through the lens unit into an electrical signal;

a magnetic member;

a coil unit disposed on a first surface of the magnetic member and oriented to face the magnetic member;

a magnetic substance unit coupled to a second surface of the magnetic member, the second surface opposite to and discontiguous with the first surface; and a position sensor disposed to be adjacent to the magnetic member and oriented to face at least a portion of the magnetic substance unit.

19. The camera module of claim 18, wherein the position sensor is disposed adjacent to a side surface of the magnetic member, and perpendicular to the first surface or the second surface.

20. The camera module of claim 18, wherein the magnetic substance unit includes:

a first part coupled to a first pole of the magnetic member; and a second part coupled to a second pole of the magnetic member.

* * * * *